United States Patent
Clancey

[15] 3,648,545
[45] Mar. 14, 1972

[54] DIFFERENTIAL CLUTCH MECHANISM

[72] Inventor: Stephen M. Clancey, Battle Creek, Mich.

[73] Assignee: Easton Corporation, Cleveland, Ohio

[22] Filed: May 18, 1970

[21] Appl. No.: 37,947

[52] U.S. Cl..................................74/710.5, 192/113
[51] Int. Cl..................................F16h 1/44, F16d 13/60
[58] Field of Search..................192/113, 107; 74/710.5, 711

[56] References Cited

UNITED STATES PATENTS

| | | | |
|---|---|---|---|
| 3,198,295 | 8/1965 | Fangman et al. | 192/113 X |
| 2,659,468 | 11/1953 | Hobbs | 192/113 |
| 3,452,848 | 7/1969 | Brunner | 192/113 |
| 3,477,312 | 11/1969 | Duer | 74/711 |
| 1,588,305 | 6/1926 | Buisson | 192/107 |
| 2,794,526 | 6/1957 | Canfield | 192/113 X |
| 3,073,424 | 1/1963 | Russell | 192/113 |
| 3,202,253 | 8/1965 | Merritt et al. | 192/113 |

*Primary Examiner*—Arthur T. McKeon
*Attorney*—Teagno & Toddy

[57] ABSTRACT

The invention of the present application serves to eliminate a stick-slip condition in a clutch for a limited slip differential mechanism by providing a novel clutching disc having a plurality of lubricant gathering slots extending through the body of the disc to provide a plurality of lubricant spreading fingers thereon. The fingers form the frictional surface of the disc and are resiliently deformable by the interaction of a sticking condition with an adjacent solid disc to create relative movement at the location of the sticking condition, thereby eliminating the sticking condition.

5 Claims, 8 Drawing Figures

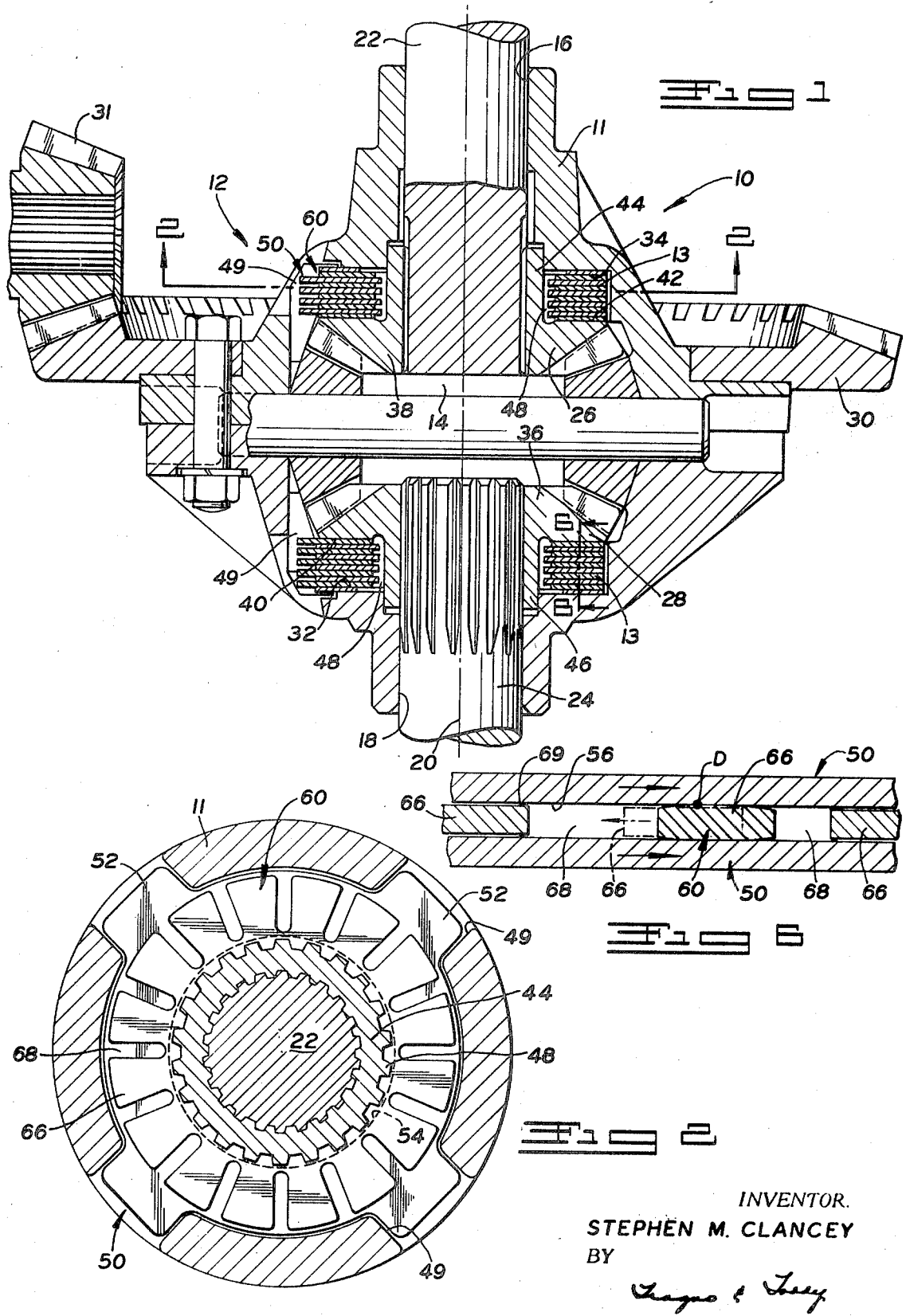

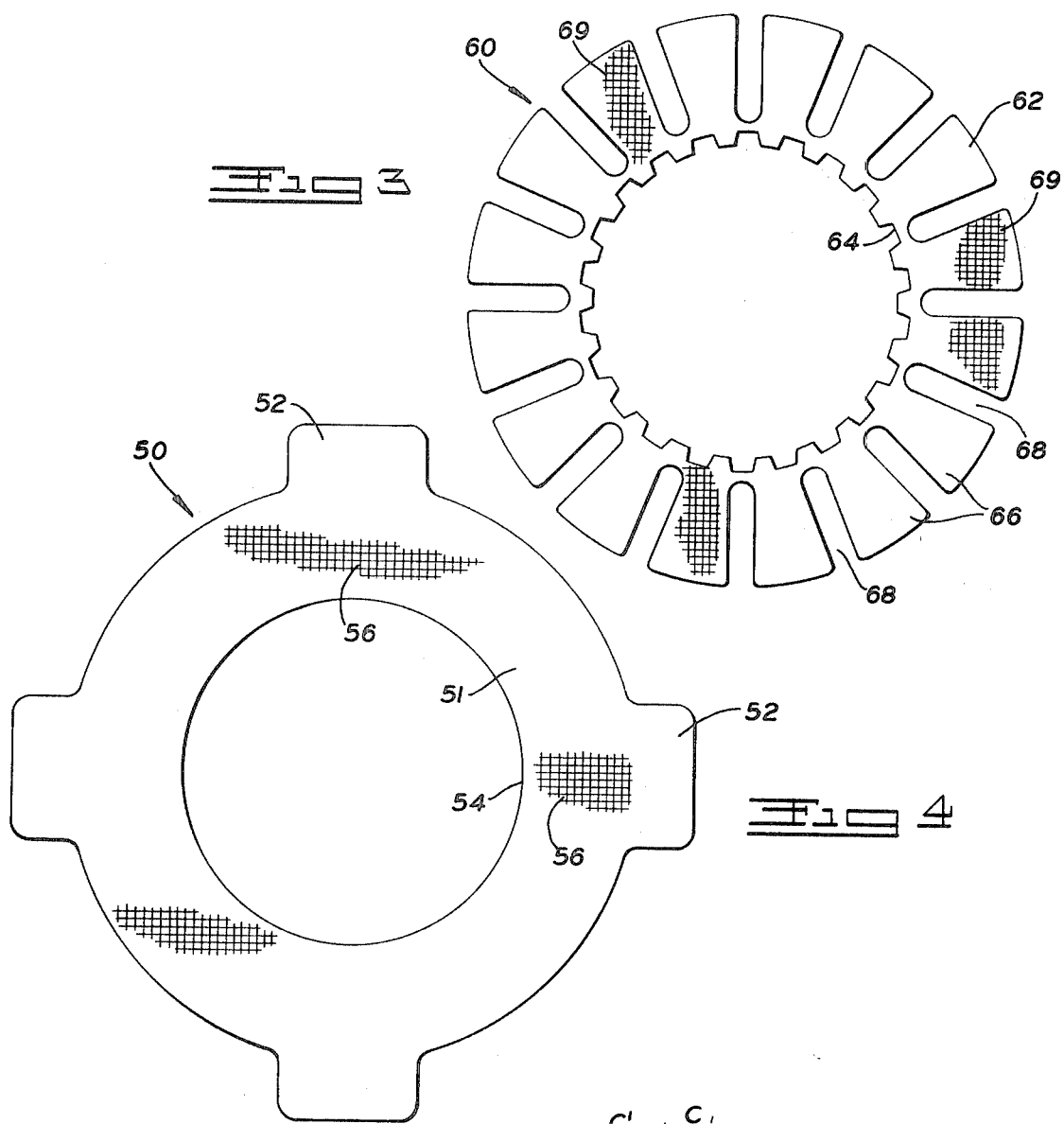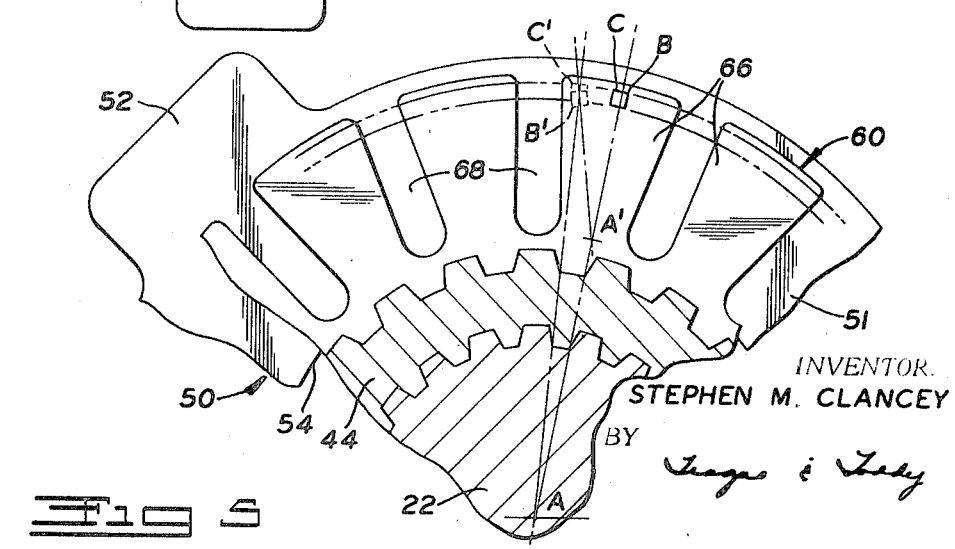

INVENTOR.
STEPHEN M. CLANCEY

DIFFERENTIAL CLUTCH MECHANISM

BACKGROUND OF THE INVENTION

1. Field of Invention

This invention relates to clutches of the type frequently used in limited slip differential gear mechanisms for vehicle axles and more particularly relates to an improved clutch disc for use in a limited slip differential.

2. Discussion of the Prior Art

Clutches have been heretofore incorporated into differential mechanisms as a means for minimizing traction wheel slippage. While differential mechanisms are in general use today, a recurring problem of sticking and slipping of the slip limiting clutches in such mechanisms during operation has created objectionable noise resulting in less than hoped for consumer acceptance and differential performance.

One example of such a differential in U.S. Letters Pat. No. 3,052,137, issued to Russell and assigned to the assignee of the instant invention. The Russell patent discloses a clutch comprising a plurality of alternately interleaved discs in a limited slip differential mechanism. The discs of the Russell patent consist of two groups, both of which have the same rigidity in a direction parallel to the plane of rotation of the discs. One group of discs in the Russell patent is driven by the differential case while the second or alternately interleaved group is adapted to drive an axle shaft through a side gear during limited slip operation of the differential.

During testing of a device similar to that disclosed in the Russell patent, it was discovered that although the device performed satisfactorily under most normal operating conditions, when relative rotation between the alternately interleaved discs of the clutch mechanism was required, as for instance when a vehicle utilizing the mechanism was turning a corner, a stick-slip condition between the plates was frequently encountered which resulted in excessive jerking and noise from the differential mechanism.

A stick-slip condition is defined as being that phenomena which results in an alternately binding and sliding of clutch surfaces relative to one another. The binding condition usually occurs only momentarily and at a very small area of adjacent clutch surfaces. However, while the binding condition exists, that area of the clutch surface is forced to rotate at the same speed as the corresponding area of the adjacent clutch surface. Thus, during existence of the sticking condition these areas of the clutch surfaces are locked together and momentarily rotate as a unit.

However, because the members on which the respective clutch discs are mounted are driving the discs at different relative speeds, a force is set up which will eventually overcome the sticking condition and result in relative sliding motion of the clutch surfaces. This phenomena is usually exhibited in a rapidly pulsating or jerking motion and is caused by a breakdown in the lubricating film and resultant wear between the clutching surfaces. The magnitude of jerking and noise which occurs within the differential mechanism because of the stick-slip condition is proportional to the magnitude of force required to overcome the sticking condition. The stick-slip condition creates the objectionable jerking and noise by causing the axle, gear train and associated portions thereof to be torsionally loaded and unloaded in rapid succession which the vehicle operator hears as loud clunking sounds coming from the differential mechanism.

If more lubricating fluid can be forced between the surfaces of the clutch discs at the exact instant and location of the sticking condition, the sticking condition can be alleviated to a considerable degree. Also, since the dynamic coefficient of friction between surfaces is always less than the static coefficient of friction, if the forces exerted by the sticking condition can be utilized to create some relative movement at the location of the sticking condition, no matter how slight this movement is, the sticking condition will be interrupted and normal sliding motion will be resumed. In the instant invention this is accomplished by providing a clutching means having two groups of alternately interleaved discs as the Russell device. However, in the instant invention, only one group of the discs is as rigid in a direction parallel to the plane of disc rotation as the discs of the Russell device. The other group of the discs is more resiliently deformable in a direction parallel to the plane of disc rotation and includes a lubricant gathering and distributing means for improving lubrication of the disc surfaces.

With these modifications and operating in a manner to be hereinafter described, the present invention achieves the desired reduction in wheel slippage while eliminating the stick-slip condition, all of which is accomplished without any increase in the complexity or cost of the differential mechanism.

SUMMARY OF INVENTION

A clutching means for a limited slip differential mechanism comprises two groups of alternately interleaved discs frictionally engaging each other.

A first group of discs is drivingly engaged with the side gears of the differential mechanism, while a second group of discs is drivingly engaged with the carrier of the differential mechanism and thus rotatable relatively to the first group of discs.

Each disc of one of the groups is resiliently deformable in a direction parallel to the plane of disc rotation while each disc of the other group is rigid in a direction parallel to the plane of disc rotation.

In addition, the discs of at least one of the groups have means for improving lubricant flow to the frictional surfaces. When a sticking condition occurs between respective friction surfaces of the clutch means, the friction surfaces of the more resilient discs are deformed by the sticking condition and relative rotation of the parts of the differential mechanism to create relative movement between one portion of a resilient disc and another portion of the same disc at the point of sticking, which results in a force within the disc biasing the disc toward the normal undeformed position.

This deformation in the clutch disc and movement thereof causes a slight relative movement at the location of the sticking condition and thus creates a condition of dynamic friction at that location, thereby alleviating the sticking condition and allowing a return to normal operation. The resiliency of the disc causes the friction surface to spring back to its normal undeformed condition. This relative movement of the frictional surface causes fresh differential fluid to flow between adjacent discs thereby further reducing the tendency of the discs to stick.

Also, because of this resiliency, the change from static to dynamic and from dynamic to static friction characteristics are much less abrupt than in the prior art devices with the result that slip-stick, chatter and the noise attributable thereto are substantially reduced.

For example, when the sticking condition releases, the reaction at the axles is substantially reduced. This is so because the resilient discs transmit less of the stored energy to the axle than the prior art rigid discs.

One method of providing the aforementioned greater resiliency to said resilient group of discs is to form a plurality of slots through the body of the disc extending from a position adjacent the hub of the disc radially outwardly through the periphery of the disc to form a plurality of fingers thereon.

If a sticking condition between the discs should occur during operation of a clutch means embodying the above described structure, the resilient fingers will be deformed by the forces exerted in the sticking condition to provide relative movement between the discs at the location of the sticking condition to thereby reduce the magnitude of forces built up during the sticking condition and thus substantially reduce or eliminate its effect on the operation of the differential mechanism.

During operation of the differential mechanism the slots of the clutch disc collect a quantity of differential lubricant and distribute this lubricant across the frictional surface of the adjacent disc, thus even further reducing the tendency to stick and cooling the adjacent surface to prevent excessive heat buildup which would contribute to degradation of the lubricant and result in excessive wear of the frictional surfaces.

Accordingly, it is an object of this invention to provide novel friction clutch means in a limited slip differential gear mechanism wherein said clutch means is comprised of a plurality of groups of alternately interleaved discs mounted for relative movement with respect to each other and wherein at least one group of said discs is more resilient than the other group in a direction parallel to the plane of rotation of said discs.

Another object of this invention is to provide a friction disc for a clutch used in a limited slip differential gear mechanism wherein said disc is configured with a plurality of lubricant collecting slots and lubricant spreading fingers having grooves in the frictional surface thereof communicating with the slots to provide better lubrication of the frictional surfaces of the clutch than was possible with prior art differential clutch mechanisms.

Another object of this invention is to provide a novel friction disc having a plurality of lubricant collecting slots and a plurality of lubricant spreading fingers in a limited slip differential mechanism and wherein each of said fingers is configured to develop a crowned frictional surface of enhancing the lubricant spreading characteristics of said fingers as frictional surface temperature increases.

Other objects and advantages of this invention will be apparent in the following detailed description and by reference to the accompanying drawing which forms a part of this specification.

BRIEF DESCRIPTION OF THE DRAWING

FIG. 1 is an axial section taken through a differential gear mechanism embodying this invention.

FIG. 2 is a section taken through the mechanism transversely of the rotation axis as indicated by section line 2—2 of FIG. 1.

FIG. 3 is an enlarged plan view of one type of disc used in the clutch means of the instant invention.

FIG. 4 is an enlarged plan view of the other type of disc used in the clutch means of the instant invention.

FIG. 5 is an enlarged fragmentary view of FIG. 2 showing the clutch mechanism of the instant invention during operation thereof.

FIG. 6 is a fragmentary sectional view taken along line 6—6 of FIG. 1.

FIG. 1 shows a known limited slip differential gear mechanism 10 for use in a vehicle axle comprising a rotatable casing 11, a gear train 12, and friction clutch means 13 associated with one or more gears of the gear train for retarding rotation thereof relative to the casing.

Figure 7:
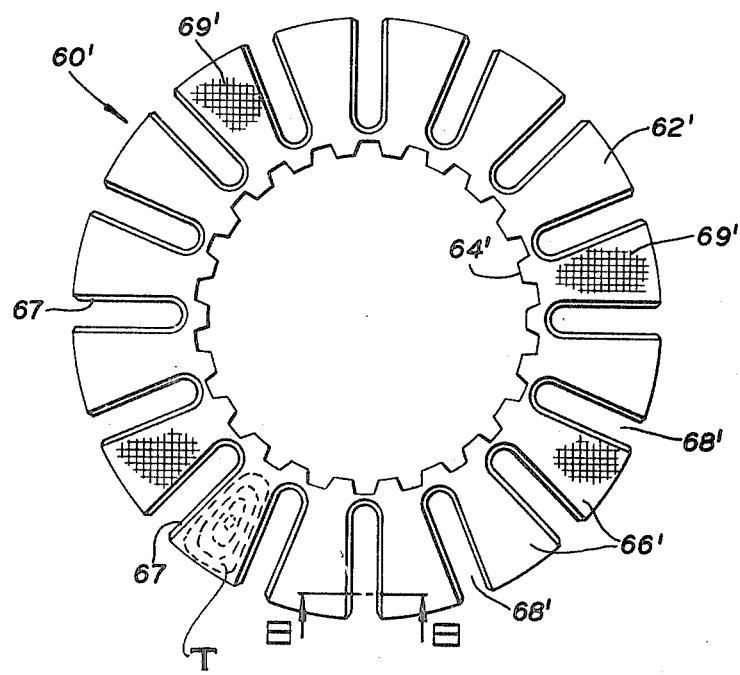
FIG. 7 is a plan view of a modified form of clutch disc of the instant invention.

The casing 11 is hollow and defines a gear chamber 14 in which the gear train 12 and the novel friction clutch means 13 are located.

The casing 11 is provided with openings 16 and 18 extending therethrough which are disposed in an aligned rotation on a common axis 20 which is also the rotation axis of the casing 11. The openings 16 and 18 receive or accommodate the driven or power output shaft means, which is here represented by axle shafts 22 and 24 whose outer ends are connected with traction wheels or the like (not shown) and whose inner or adjacent ends are connected with the gear train 12 by means of side gears 26 and 28 for driving rotation relative to the casing 11.

The differential mechanism 10 also includes a conventional ring gear 30 extending around and mounted on the casing 11.

A drive pinion 31 is here shown in mesh with the ring gear 30 and represents the power input means of the differential mechanism.

The casing 11 is provided with annular thrust portions 32 and 34 which surround the openings 16 and 18 and are here represented as being annular surfaces formed on the casing 11. The bodies 36 and 38 of the side gears 26 and 28 are provided with corresponding annular thrust portions 40 and 42 located in an axially opposed relation to the annular thrust portions 32 and 34.

The friction clutch means 13 is a pressure-responsive clutch means and is located between the annular thrust portions 32 and 34 of the casing 11 and the corresponding thrust portions 40 and 42 of the side gears 28 and 26 respectively so that limited outward axial shifting of the side gears, in response to the pressure-angle torque reaction from the meshed teeth of the gear train, will cause the clutch to be actuated to an engaged or energized condition, all of which is presently known in the art.

The clutch means 13 is a disc-type friction clutch having a first group of friction discs or plates 50 and a second group of such discs or plates 60 which are interleaved between the discs of the first group.

The clutch discs 50 are connected with the casing 11 by connecting means which will presently be described and the clutch discs 60 are connected with hubs 44 and 46 of the side gears 26 and 28. For this purpose, the hubs are provided with an annular group of splines 48 extending axially therealong and the associated clutch discs 60 have radial teeth 62 engaged with such splines, as shown in the drawings.

The splined connections of the clutch discs 60 with the hub 44 or 46 and the connections of the clutch discs 50 with the casing 11 permit sufficient axial shifting of the clutch discs in response to the limited outward axial movement of the side gears 22 or 28 to produce the above-mentioned engaged or energized condition of the clutch.

The connection of the clutch discs 50 with the casing 11 is provided in a known manner by circumferentially spaced radial anchorage lugs on the outer periphery thereof, in this case four such lugs 52 as shown in FIG. 2. The lugs 52 project into correspondingly located openings or recesses 49 in the casing 11 and cooperate with the adjacent portions of this casing section for holding the discs 50 against rotation relative to the casing section in which they are mounted.

As previously stated, the clutch means 13 is comprised of alternately interleaved clutch discs 50 and 60. The configuration of these clutch discs will now be more particularly described by reference of FIGS. 3 and 4.

The clutch disc 50 of FIG. 4 comprises a thin annular plate member 51 having an aperture 54 through the center thereof. Said aperture 54 being of larger diameter than the splined hubs 44, 46 of the side gears 26, 28 for providing a clearance therewith when mounted in the differential housing 11. The clutch disc 50 further includes lugs 52 for engaging the recesses 49 in the casing 11 for providing non-rotatable engagement therewith. Both faces of the disc 50 are provided with a series of lubricant grooves 56 for admitting lubricant to the friction surfaces during operation of the differential mechanism. One pattern for these grooves is shown in Russell U.S. Pat. No. 3,073,424. Other patterns could be of spiral or concentric circular configuration.

The clutch disc 60 of FIG. 3 comprises a thin annular plate member 62 having a splined aperture 64 through the center thereof for engaging the splined hub 44, 46 of one of the side gears 26, 28 and for providing driving engagement therewith when mounted thereon.

The clutch disc 60 further includes a plurality of friction surfaces in the form of fingers 66 which are produced by forming a plurality of slots 68 through the plate member 62 of the clutch disc 60 as shown in FIG. 3. Both faces of the disc 60 are provided with a plurality of lubricant scores or grooves 69 communicating across the frictional surface of the fingers between the slots or lubricant collection reservoirs. One suitable pattern is shown in Russell U.S. Pat. No. 3,073,424. However, concentric circular or spiral configurations are also possible. The pattern of these grooves controls the frictional characteristics of the surface and aids in determining the lubricant distribution pattern.

The fingers 66 provided a frictional surface on the disc 60 which is more resilient in the plane of rotation than the frictional surface of a disc 50 which will be adjacent thereto during operation of the differential mechanism.

The clutch disc 60 of FIG. 7 represents a modified form of the clutch disc 60 as shown in FIG. 3 and like numerals followed by a prime (') indicate like parts as previously described with reference to FIG. 3. The disc 60' of FIG. 7 is further provided with a relieved portion 67 around the peripheral edge of the slots 68' to provide a lead which allows lubricant gathered in the slots 68' to flow more freely between the frictional surfaces during operation of the clutching mechanism. Alternatively, the relieved portion 67 could be in the form of a radius or chamfer and still produce the desired result. The relief 67 as shown need only be from 0.003 to 0.010 of an inch deep by approximately 0.030 of an inch wide to accomplish the purpose intended.

In actual practice, I have found that utilizing carbonitrided steel discs of approximately 0.060 to 0.080 thickness and having 16 equally spaced slots, each one-eighth inch wide which extend to within approximately 0.200 inch of the major diameter of the spline and utilizing four of these discs 60 interleaved with 5 of the unsplined discs 50 on each side gear provides satisfactory results for most limited slip differential mechanisms of the type used in motor vehicles today.

The grooving of the frictional surfaces can be accomplished either by using the "waffle weave" pattern of the Russell patent or by using concentric circular or spiral grooves in the frictional surfaces of the discs transversely to the slots. The important point is that the grooves communicate across the frictional surface of the fingers and between adjacent slots to improve lubricant flow.

DESCRIPTION OF OPERATION

The provision of the aforementioned fingers in the disc 60 and the method by which they cooperate with the other elements of the limited slip differential mechanism to overcome the problems of the prior art is considered to be an important feature of my invention.

As previously stated, one major problem of prior art limited slip differentials was the stick-slip condition which resulted in objectionable noise, and chatter during operation of the limited slip differential mechanism.

By providing the slots 68 through alternate interleaved discs 60 of the clutch means 13, the frictional surfaces of discs 60 are made more resilient in the plane of rotation than the mating frictional surface of a disc 50 on either side thereof.

This greater resiliency takes advantage of the stick-slip phenomena to create a pulsating motion of the fingers 66 relative to discs 50 which will force or pump lubricant from the slots 68' into the grooves 56 or 69 between the friction surfaces of the clutch means 13 thereby reducing the stick-slip condition and substantially eliminating wear, noise and chatter.

For example, when a vehicle utilizing a limited slip differential mechanism turns a corner, a relative slipping condition between the clutch surfaces must occur as indicated by arrows attached to the respective discs in FIG. 6. If at this time, the lubricant film between the discs breaks down resulting in a sticking condition at point D between the fingered portion of the disc 60 and the mating portion of an adjacent disc 50, it should be apparent that these portions of the discs will momentarily tend to rotate at the same relative speed as a result of the sticking condition. However, the hub or splined portion of the disc 60 adjacent the aperture 64 and the remaining fingers of the disc 60 will tend to continue to rotate at the slipping condition speed because of the aforementioned driving engagement with the side gear 26 or 28. When this happens, the fingers 66 will momentarily be resiliently deformed (as shown by the solid lines in FIG. 6) and loaded until the force exerted overcomes the sticking condition, whereupon the finger 66 will spring back to the normal unloaded and undeformed position (as shown by dotted lines in FIG. 6) relative to the splined portion of the disc 60. Since the slot 68 is filled with differential gear lubricant, the snap back action of the finger 68 will force some of this lubricant into the grooves 56 and 69 between the friction surfaces.

The force necessary to overcome the sticking condition is substantially reduced because the inner end of the fingers 66 is forced to rotate at the same speed as the hub portion adjacent the aperture 64, while the other end of the same rib is being displaced by the sticking condition and forced to rotate at the same speed as a rigid disc 50 adjacent thereto. Thus as the finger 66 begins to deform, a slight skewing action is created all along the surface of the finger 66 adjacent the disc 50. Since movement of any type will result in changing the applicable coefficient of friction from the static coefficient to the dynamic coefficient, the force which can be exerted by the sticking condition will be reduced.

The manner in which the skewing action occurs can be more readily understood by reference to FIG. 5 and by examining the movement of an element B on disc 60 relative to a corresponding element C on the disc 50 at the instant sticking condition occurs.

During normal slipping operation of the clutch discs 50 and 60 the slipping motion elements B and C will describe an annular ring (as shown in dotted lines) with its center at A since both friction surfaces are rotating about point A. When a sticking condition occurs at B and C, the surfaces at the elements B and C tend to rotate together. Since disc 50 is rigid in the plane of rotation, the element C will continue to move in an arc about the center of rotation A to the position C'. As this occurs, the sticking condition will tend to deform the finger 66 because the splined hub portion of the disc 60 is still being driven by the axle and side gear at the slipping condition speed. The finger 66 will be deformed about a point near its root (A') and the element B of the finger will, in effect, instantaneously rotate about different centers of rotation, movement between these elements occurs resulting in the following beneficial effects:

1. The sticking condition is interrupted by the skewing action of the elements with respect to each other.
2. The applicable coefficient of friction is changed from the static coefficient to the lower dynamic coefficient thereby reducing the force available to deform the finger,
3. which allows the finger to spring back to its normal undeformed position.

In addition, the spring-back motion of the finger 66 will tend to force or pump the excess lubricant contained in the slot 68 into the lubrication grooves 56 and 69 between adjacent faces of the discs 50 and 66, thus further reducing or eliminating the sticking condition.

Figure 8:
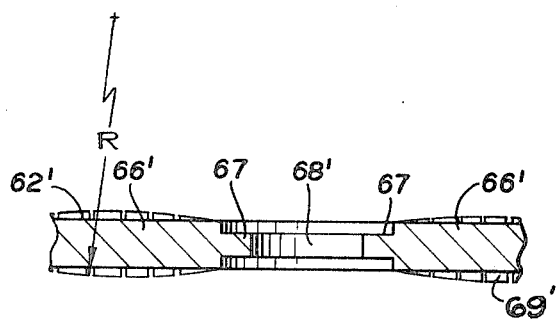
FIG. 8 is an enlarged sectional view taken along the line 8—8 of FIG. 7.

During normal slipping operation of the disc 62', a temperature gradient is created across the frictional surfaces of the fingers 66' with the highest temperature existing at the center of the finger as shown by reference to FIGS. 7 and 8. This is so because of the pattern of heat dissipation away from the frictional surface. If a plot is made of the isothermal lines existing across the face of one finger during slipping operation of the clutching means, a line of constant temperature similar to that shown by the dotted lines designated T in FIG. 7 will become evident. That is, the highest temperature will exist in the center of the finger 66' with the temperature being considerably reduced as the plot moves away from the center of the finger. This is so because the periphery of the disc and edges of the finger are exposed to the cooling effect of the main body of lubricating fluid in the differential mechanism while the root of the finger 66' is in contact with the hub of the disc and is cooled by transferring heat to the side gear or axle shaft on which the disc is mounted.

This temperature gradient will produce a crowned effect of the finger (designated R in FIG. 8) because the material of the finger will expand more at the area of higher temp in the center of the finger than at its outer most portions. This crown will alleviate the pressure at the leading and trailing edges of the finger 66' and thereby further aid in permitting flow of lubricant between the frictional surfaces.

In practice, temperature gradients of 100° F. under extreme operating conditions have been observed.

It should be noted that a temperature gradient of 100° will produce a crown of the carbonitrided steel disc previously described by approximately 0.000022 inches per side or increase the total thickness of the disc at the high point of the crown by approximately 0.000044 inches. This increase in the crown of the finger decreases the force exerted at the leading and trailing edges of the fingers by concentrating the frictional force at the high point of the crown, thus permitting easier access of cooling lubricating fluid to the frictional surface and considerably improving the flow of the lubrication to the frictional surfaces, thereby further reducing or eliminating the stick-slip condition.

In actuality, the stick-slip condition will result in a rapidly pulsating or jerking effect on the frictional forces exerted between the discs. Although only one cycle of this pulsating effect has been described by the foregoing, it should now be apparent that the peak forces exerted in a sticking condition of a limited slip differential will be substantially reduced or eliminated by utilizing the instant invention.

In addition, the slots 68 between the fingers 66 act as lubricant collection reservoirs. As the discs rotate relatively to each other the lubricant which is collected in the slots 68 is spread across the face of the adjacent disc. This provides better lubrication of the friction surfaces by constantly supplying them with fresh lubricant and results in cooler operation of the clutching means, which reduces wear, the tendency to stick slip and lubricate degradation to a considerable degree.

If the disc of FIG. 7 is used, the relieved portions 67 serve as a lead to allow freer flow of lubricant from the slots 68' to the grooves 69 in the friction surfaces of the disc.

As the discs 50, 60' rotate relatively to each other, the lubricant collected in the slots 68' is drawn into the relieved area by viscous shear of the fluid and relative movement of the discs. From the relieved area 68' into intimate contact with the frictional surfaces, thereby constantly supplying fresh lubricant which cools and lubricates these surfaces. This flushing action prevents lubricant from becoming trapped between the frictional surfaces as was possible with prior art devices and provides better mixing of the lubricant in the clutch means with the main body of the lubricant in the differential mechanism thereby reducing lubricant degradation to a considerable degree.

A further advantage of utilizing the instant invention in a limited slip differential mechanism is that the force transmitted to the axle shaft when the sticking condition releases is attenuated by the relative resiliency of the fingers 66. This should now be readily apparent because a rigid member will always transmit a higher percentage of the shock loads it receives than a more resilient member. Thus the instant invention not only reduces the effect of a stick-slip condition on the vehicle in which the differential mechanism is mounted and eliminates a jerking condition which would otherwise be felt by the vehicle operator.

I claim:

1. In a limited slip differential gear mechanism comprising;
a rotatable housing, a pair of shafts extending from said housing, said shafts being mounted for driving rotation relative to said housing and each other, a side gear mounted on each of said shafts for rotation therewith, each of said side gears having a surface on one face thereof, each of said gear surfaces being axially opposite a surface in said housing, clutch means interposed between each pair of said surfaces for engaging said surfaces and actuatable for controlling the relative rotation of said shafts with respect to said housing and each other, and said side gears being shiftable in response to a pressure-angle torque reaction of a drive train to actuate said clutch means,
the improvement wherein said clutch means comprises;
a plurality of a first type of disc having a friction surface on both sides thereof and having means for engaging said housing to provide driving rotation therewith,
a second type of disc alternately interleaved with said first type of disc, each of said second type of disc having means providing for driving rotation with one of said shafts, and
each of one type of said discs having a plurality of radially extending fingers thereon to provide a frictional surface which is deflectable in response to said disc encountering a sticking condition relative to an adjacent disc during relative rotation therebetween.

2. In a limited slip differential mechanism having a rotatable housing, an axle mounted in the housing, a gear train for providing normal driving rotation of the axle relative to the housing, a clutch means for retarding rotation of the axle relative to the housing, and means for actuating the clutch means to retard axle rotation relative to the housing;
the improvement which comprises:
said clutch means having a plurality of groups of alternately interleaved discs frictionally engaging each other when said clutch means is in the actuated position,
one group of said discs being configured for driving rotation with said housing and the other group of said discs being configured for driving rotation with said axle, and
one group of said discs having a plurality of radial slots extending throughout a major portion of the body of each disc of said group to create a plurality of resilient fingers thereon for providing a frictional surface which is deflectable in response to said disc encountering a sticking condition relative to an adjacent disc during relative rotation therebetween.

3. The clutching means of claim 2 wherein each of said resilient fingers is provided with a plurality of lubricant grooves extending across a surface thereof and between the slots disposed on either side of said finger.

4. The clutch means of claim 2 wherein both surfaces of all of said discs in the clutching means include a grooved pattern thereacross.

5. The clutch means of claim 2 wherein each of said resilient fingers is provided with a reduced portion on the leading and trailing edges thereof.

* * * * *

UNITED STATES PATENT OFFICE
CERTIFICATE OF CORRECTION

Patent No. 3,648,545                     Dated   March 14, 1972

Inventor(s)   Stephen M. Clancey

It is certified that error appears in the above-identified patent and that said Letters Patent are hereby corrected as shown below:

On the cover sheet [73] "Easton Corporation" should read -- Eaton Corporation --.

Signed and sealed this 8th day of August 1972.

(SEAL)
Attest:

EDWARD M.FLETCHER,JR.                    ROBERT GOTTSCHALK
Attesting Officer                        Commissioner of Patents